(12) United States Patent
Ranadive et al.

(10) Patent No.: US 12,499,082 B2
(45) Date of Patent: Dec. 16, 2025

(54) DISAGGREGATION OF PROCESSING PIPELINE

(71) Applicant: Nvidia Corporation, Santa Clara, CA (US)

(72) Inventors: Adit Ranadive, Mountain View, CA (US); Omri Kahalon, Yehud (IL); Aviad Shaul Yehezkel, Yoqneam Illit (IL); Liran Liss, Atzmon (IL); Gal Shalom, Givat Avni (IL); Yorai Itzhak Zack, Haifa (IL); Tushar Khinvasara, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 668 days.

(21) Appl. No.: 17/944,229

(22) Filed: Sep. 14, 2022

(65) Prior Publication Data

US 2023/0376450 A1    Nov. 23, 2023

(30) Foreign Application Priority Data

May 19, 2022  (IN) .............................. 202241028812

(51) Int. Cl.
*G06F 15/82*  (2006.01)
*G06F 9/38*   (2018.01)

(52) U.S. Cl.
CPC .......... *G06F 15/825* (2013.01); *G06F 9/3867* (2013.01)

(58) Field of Classification Search
None
See application file for complete search history.

(56) References Cited

U.S. PATENT DOCUMENTS

| | | |
|---|---|---|
| 7,669,166 B1 | 2/2010 | Brebner et al. |
| 9,405,866 B1 | 8/2016 | Cho et al. |
| 9,983,857 B2 | 5/2018 | Powers et al. |
| 10,178,310 B1 * | 1/2019 | Palanisamy ............... G06F 9/00 |
| 10,521,283 B2 | 12/2019 | Shuler et al. |
| 10,841,243 B2 | 11/2020 | Levi et al. |

(Continued)

OTHER PUBLICATIONS

J. Kalomiros, J. Vourvoulakis and S. Vologiannidis, "A Workflow for Designing Video Processing Pipelines with PYNQ," 2021 11th IEEE International Conference on Intelligent Data Acquisition and Advanced Computing Systems: Technology and Applications (IDAACS), Cracow, Poland, 2021, pp. 109-114. (Year: 2021).*

(Continued)

*Primary Examiner* — Frank D Mills
(74) *Attorney, Agent, or Firm* — Meitar Patents Ltd.; Daniel Kligler

(57) ABSTRACT

A method for processing includes receiving a definition of a processing pipeline including multiple sequential processing stages. The processing pipeline is partitioned into a plurality of partitions. The first partition of the processing pipeline is executed on a first computational accelerator, whereby the first computational accelerator writes output data from a final stage of the first partition to an output buffer in a first memory. The output data are copied over a packet communication network to an input buffer in a second memory. The second partition of the processing pipeline is executed on a second computational accelerator using the copied output data in the second memory as input data to a first stage of the second partition.

21 Claims, 3 Drawing Sheets

(56) References Cited

U.S. PATENT DOCUMENTS

| | | | |
|---|---|---|---|
| 11,271,874 | B2 | 3/2022 | Levi et al. |
| 2013/0163475 | A1 | 6/2013 | Beliveau et al. |
| 2016/0191530 | A1 | 6/2016 | Jain et al. |
| 2016/0294983 | A1* | 10/2016 | Kliteynik .......... G06F 15/17331 |
| 2017/0372494 | A1* | 12/2017 | Zhu ...................... H04N 19/521 |
| 2018/0107627 | A1* | 4/2018 | LeBeane ............. H04L 49/9063 |
| 2019/0081899 | A1 | 3/2019 | Mundkur et al. |
| 2019/0317802 | A1* | 10/2019 | Bachmutsky ......... G06F 9/5044 |
| 2021/0304066 | A1* | 9/2021 | Tomioka ................ G06F 9/3867 |
| 2022/0006970 | A1* | 1/2022 | Bian ................ H04N 21/41415 |
| 2022/0078043 | A1 | 3/2022 | Marcovitch et al. |
| 2022/0078107 | A1 | 3/2022 | Subhaschandra et al. |

OTHER PUBLICATIONS

U.S. Appl. No. 17/955,583 Office Action dated Nov. 28, 2023.
U.S. Appl. No. 17/955,583 Office Action dated Oct. 13, 2023.
Wikipedia, "PCI Express," pp. 1-26, last edited Aug. 29, 2022.
Nvidia Developer, "Cuda Toolkit," NVIDIA Corporation, pp. 1-7, year 2022, as downloaded from https://developer.nvidia.com/cuda-toolkit.
Purandare, "DeepStream SDK," NVIDIA, pp. 1-19, Mar. 2018, as downloaded from https://on-demand.gputechconf.com/gtc/2018/presentation/s81047-introduction-to-deep-stream-sdk.pdf.
Syrivelis, U.S. Appl. No. 17/673, 105, filed Feb. 16, 2022.
Marcovitch et al., U.S. Appl. No. 17/707,555, filed Mar. 29, 2022.
Bar Yanai et al., U.S. Appl. No. 17/955,583, filed Sep. 29, 2022.
Infiniband Trade Association, "InfiniBandTM Architecture Specification", vol. 1, Release 1.3, pp. 1-1842, Mar. 3, 2015.
Wheeler, "DPU-Based Hardware Acceleration: A Software Perspective," White Paper, The Linley Group, Inc., pp. 1-8, Jun. 2021.

* cited by examiner

DISAGGREGATION OF PROCESSING PIPELINE

FIELD OF THE INVENTION

The present invention relates generally to computer systems and software, and particularly to methods for distribution of stages in a processing pipeline among multiple processors.

BACKGROUND

Computational accelerators, such as graphics processing units (GPUs), are able to perform many parallel processing tasks far more efficiently than a central processing unit (CPU). For example, GPUs are useful in performing convolutions of large matrices with high throughput for artificial intelligence (AI) applications. For this reason, GPUs are widely deployed in servers in data centers, and dedicated software tools, such as CUDA®, are available to facilitate programming of GPUs.

Software libraries are also available to GPU programmers, containing computational modules that can be pipelined to carry out complex tasks. One example of this sort of library is the Nvidia DeepStream software development kit (SDK), which facilitates real-time AI-based analysis of streaming video signals.

SUMMARY

Embodiments of the present invention that are described hereinbelow provide improved systems, methods, and software for pipelined data processing.

There is therefore provided, in accordance with an embodiment of the invention, a method for processing, which includes receiving a definition of a processing pipeline including multiple sequential processing stages. The processing pipeline is partitioned into a plurality of partitions. Each partition includes one or more successive stages of the processing pipeline, including at least a first partition and a second partition following the first partition in the processing pipeline. The first partition of the processing pipeline is executed on a first computational accelerator, whereby the first computational accelerator writes output data from a final stage of the first partition to an output buffer in a first memory. The output data are copied over a packet communication network to an input buffer in a second memory. The second partition of the processing pipeline is executed on a second computational accelerator using the copied output data in the second memory as input data to a first stage of the second partition.

In a disclosed embodiment, the first and second computational accelerators include graphics processing units (GPUs). Additionally or alternatively, the stages of the processing pipeline include computational modules selected from a software library for implementation on the computational accelerators.

In one embodiment, the plurality of partitions includes a third partition following the second partition in the processing pipeline, and the method includes copying further output data written to the second memory by the final stage of the second partition over the packet communication network to a third memory for input to execution of the third partition on a third computational accelerator.

In some embodiments, the first and second computational accelerators are connected to the packet communication network by respective first and second network interface controllers (NICs), and copying the output data includes executing a remote direct memory access (RDMA) transaction between the first and second NICs. In a disclosed embodiment, executing the RDMA transaction includes transmitting an RDMA read request packet from the second NIC to the first NIC, and transmitting one or more RDMA read response packets containing the output data from the final stage of the first partition from the first NIC to the second NIC. Additionally or alternatively, the method includes transmitting a send packet from the first NIC to the second NIC containing metadata with respect to the output data to be copied, wherein the second NIC transmits the RDMA read request in response to receiving the metadata.

There is also provided, in accordance with an embodiment of the invention, a processing system, including a network interface controller (NIC), for connection to a packet communication network, a first computational accelerator, and a first memory. A central processing unit (CPU) is to receive a definition of a processing pipeline including multiple sequential processing stages, to partition the processing pipeline into a plurality of partitions, each partition including one or more successive stages of the processing pipeline, including at least a first partition and a second partition following the first partition in the processing pipeline, to instruct the first computational accelerator to execute the first partition of the processing pipeline, whereby the first computational accelerator writes output data from a final stage of the first partition to an output buffer in the first memory, and to instruct the NIC to copy the output data over the packet communication network to an input buffer in a second memory for execution of the second partition of the processing pipeline on a second computational accelerator using the copied output data in the second memory as input data to a first stage of the second partition.

There is additionally provided, in accordance with an embodiment of the invention, a computer program product, including a tangible, non-transitory computer-readable medium in which program instructions are stored. The instructions, when read by a computer, cause the computer to receive a definition of a processing pipeline including multiple sequential processing stages, to partition the processing pipeline into a plurality of partitions, each partition including one or more successive stages of the processing pipeline, including at least a first partition and a second partition following the first partition in the processing pipeline, to instruct a first computational accelerator to execute the first partition of the processing pipeline, whereby the first computational accelerator writes output data from a final stage of the first partition to an output buffer in a first memory, and to instruct a NIC to copy the output data over a packet communication network to an input buffer in a second memory for execution of the second partition of the processing pipeline on a second computational accelerator using the copied output data in the second memory as input data to a first stage of the second partition.

The present invention will be more fully understood from the following detailed description of the embodiments thereof, taken together with the drawings in which:

DETAILED DESCRIPTION OF EMBODIMENTS

Figure 1:
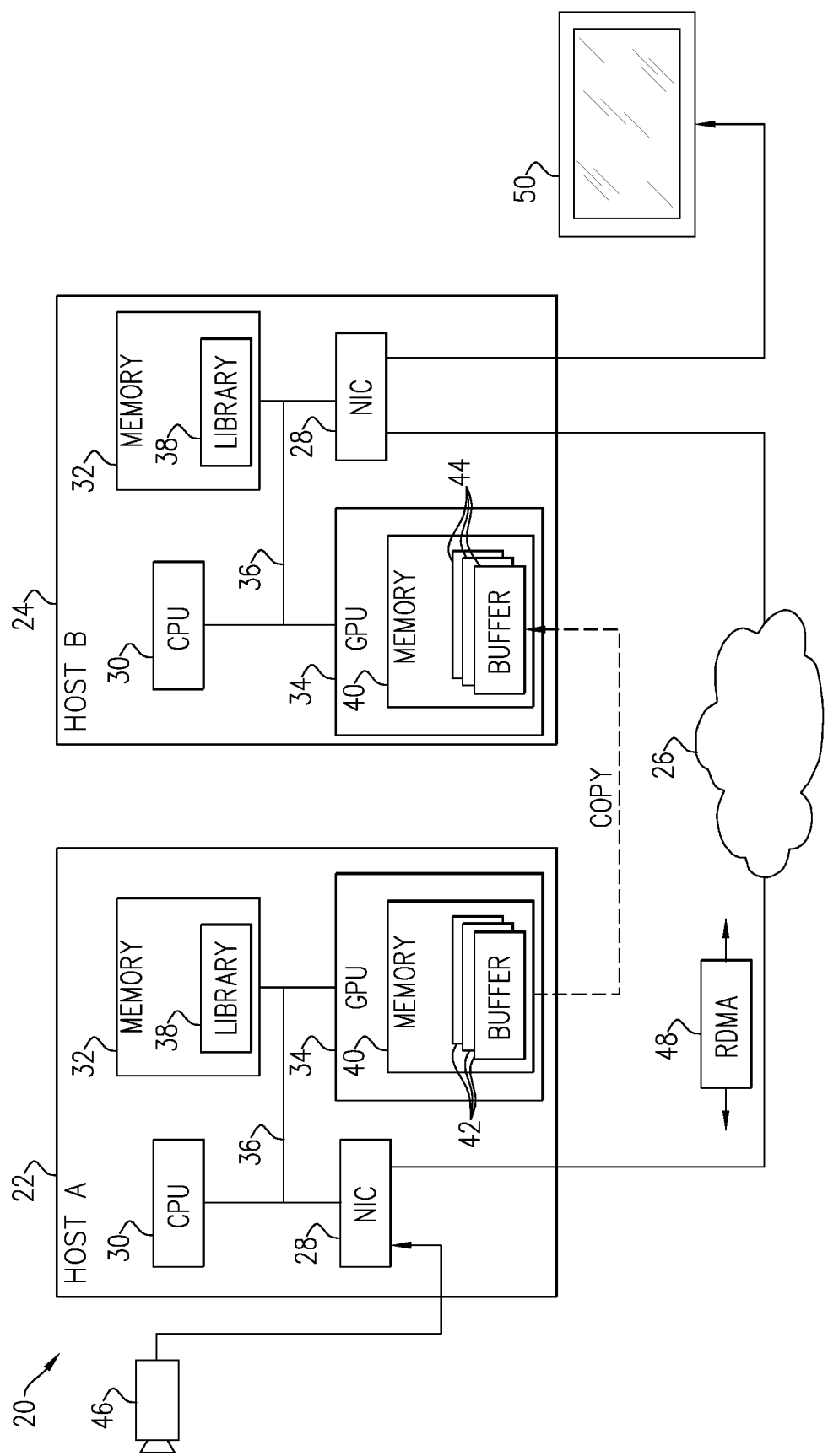
FIG. 1 is a block diagram that schematically illustrates a computing system, in accordance with an embodiment of the invention.

Some AI tasks are too complex for a single GPU to complete within a target timeframe. For example, real-time processing of a high-resolution video stream requires that the GPU complete all the processing stages in a DeepStream pipeline within the duration of a single video frame. A single GPU may not have sufficient processing throughput to satisfy this requirement.

Embodiments of the present invention address this problem by enabling a programmer to partition a processing pipeline serially between two or more computational accelerators, such as GPUs, which are connected by a packet communication network. Each partition comprises one or more successive stages in the sequence of stages in the original pipeline, and is executed by a corresponding accelerator. Thus, for example, the first partition of the processing pipeline is executed on a first computational accelerator, which writes output data from the final stage of the first partition to an output buffer in the memory of the first computational accelerator. The output data are copied over a packet communication network to an input buffer in the memory of a second computational accelerator, which executes the second partition of the processing pipeline using the copied output data in the second memory as input data to the first stage of the second partition. When there are three or more partitions, the output data from the second partition are copied over network to the third partition, and so forth.

Using this approach, the embodiments that are described herein can effectively "splice" an existing pipeline, which has been defined using modules from a software library, at any desired point, and thus accelerate the execution of the pipeline without affecting its functionality. At each splice, all the data and metadata output by the final stage of one partition are transferred, without compression or other data loss, to the first stage of the next partition. In the disclosed embodiments, the first and second computational accelerators are connected to the packet communication network by respective network interface controllers (NICs), which execute a remote direct memory access (RDMA) transaction to transfer the data. Alternatively, however, other reliable communication protocols can be used for this purpose.

Thus, in a disclosed embodiment, a computer receives a definition of a software processing pipeline for execution by one or more computational accelerators. The processing pipeline comprises at least n sequential processing stages, wherein n 2. Each stage reads input data from a respective input buffer and writes output data to a respective output buffer, which serves as the input buffer for a succeeding stage in the processing pipeline. The processing pipeline is partitioned into at least a first partition, comprising stages 1 through j of the processing pipeline, and a second partition, comprising stages j+1 through n of the processing pipeline, wherein 1≤j<n−1. The first partition of the processing pipeline is executed on a first computational accelerator, which writes the output data from stage j to the respective output buffer in a memory of the first computational accelerator.

The output data from stage j are copied over a packet communication network by RDMA to the respective input buffer of stage j+1 in a memory of a second computational accelerator. The second partition of the processing pipeline is executed on the second computational accelerator using the copied output data. Depending on the number of stages and the number of partitions in the pipeline, the second partition may output a final processing result, or the output data from the second partition may be copied to the memory of a third computational accelerator for execution of the next partition of the pipeline.

FIG. 1 is a block diagram that schematically illustrates a computing system 20, in accordance with an embodiment of the invention. System 20 comprises multiple host computers, of which two computers 22 and 24, labeled Host A and Host B, are shown in FIG. 1. In this example and in FIG. 2, only two host computers and corresponding pipeline partitions are shown; but the principles of these examples may be extended to processing pipelines comprising three or more partitions, as explained above.

Host computers 22 and 24 are connected to a packet communication network 26, such as an Ethernet, Internet Protocol (IP), or InfiniBand network, by respective NICs 28. Each host computer comprises a CPU 30, a host memory 32, and a GPU 34, which are connected to one another and to NIC 28 by a host bus 36, such as a PCI Express® (PCIe®) bus. Memory 32 contains program code for execution by CPU 30 and GPU 34, including computational modules selected from a software library 38 for implementation in a processing pipeline on GPU 34 and drivers for controlling NICs 28. The program code may be downloaded to computers 22 and 24 in electronic form, for example over network 26. Additionally or alternatively, the program code may be stored on tangible, non-transitory computer-readable media, such as optical, magnetic, or electronic memory media.

Each GPU 34 comprises a memory 40, containing buffers 42, 44 used by the stages in the processing pipeline Each stage reads input data from a respective input buffer and writes output data to a respective output buffer, which serves as the input buffer for the next stage in the processing pipeline. The pipeline is partitioned between host computers 22 and 24. Thus, the output data written to buffer 42 by the final stage in the partition running on GPU 34 of host computer 22 are copied between NICs 28 over network 26 to serve as input data in buffer 44 for the first stage in the partition running on GPU 34 of host computer 24.

In the pictured example, host computer 22 receives an input stream of video data (and possibly audio data, as well) from an input source, such as a video camera 46 or multiple video cameras. The input stream may be received through NIC 28 or through any other suitable input interface. After a frame of input data has been processed by GPU 34 of host computer 22 through the first partition of the pipeline, NIC 28 of host computer 22 reads the output data from buffer 42 and transfers the data in a series of RDMA packets 48 over network 26 to NIC 28 of host computer 24.

NIC 28 of host computer 24 writes the data from RDMA packets 48 to buffer 44, to serve as the input data for the first pipeline stage run by GPU 34 of host computer 24. After GPU 34 has processed the data, the final result, such as an enhanced and/or annotated frame of video data, is output to a target destination, such as a display 50 or another computer or storage device. While host computer 24 processes the data transferred from host computer 22 in a given frame, host computer 22 proceeds to receive and process the next frame of input data in buffers 42, so that the pipeline can handle the input video stream in real time at the video frame rate.

Figure 2:
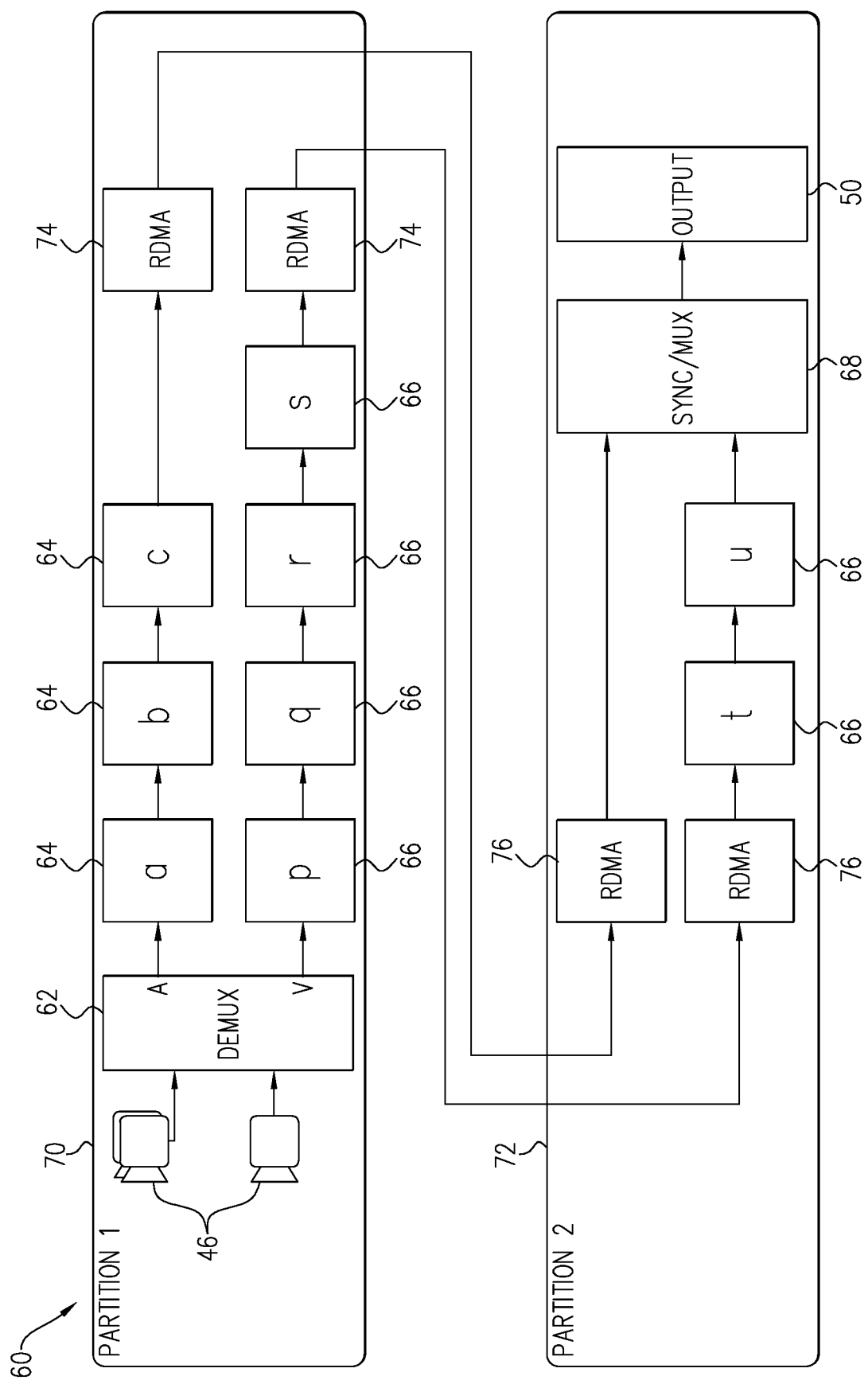
FIG. 2 is a block diagram that schematically illustrates a partitioned processing pipeline, in accordance with an embodiment of the invention.

FIG. 2 is a block diagram that schematically illustrates a partitioned processing pipeline 60, in accordance with an embodiment of the invention. Pipeline 60 comprises a demultiplexer 62, which divides the input data from video cameras 46 into an audio stream (A) and a video stream (V). An audio sub-pipeline comprises a succession of audio processing stages 64, labeled a, b, c, to decode, process, and re-encode the audio stream. A video sub-pipeline comprises a succession of video processing stages 66, labeled p, q, r, s, t u, to decode, process, and re-encode the video stream. For example, the video processing stages may apply AI algorithms to identify and tag objects of a certain type or types in each video frame. A multiplexer 68 resynchronizes the audio and video streams and combines the synchronized streams in the proper format for output to the target destination.

Pipeline 60 is partitioned into a first partition 70, which runs on host computer 22, for example, and a second partition 72, which runs on host computer 24 (FIG. 1). To partition the pipeline in this manner, RDMA server software modules 74 are inserted following stages c and s in the audio and video sub-pipelines, respectively, and serve as "sinks" for the data to be output from partition 70. Corresponding RDMA client software modules 76 are inserted in partition 72 to serve as "sources" of data for processing stages 66 and 68. Software instructions in RDMA server modules 74 and RDMA client modules 76 cause NIC driver software running on the respective CPUs 30 to submit commands (referred to as "work queue elements," or "WQEs") for execution by the respective NICs 28. These commands cause the NICs to carry out the RDMA transactions needed to transfer the contents of the output buffers of stages c and s in partition 70 to the corresponding input buffers in partition 72.

Software modules 74 and 76 have application program interfaces (APIs) for use by the programmer of pipeline 60 in specifying control information, such as the network addresses and ports of the server and the client; the type(s) of data to be transferred; and the types, sizes, and number of buffers that will be used to hold the data. The NIC drivers running on CPUs 30 use this control information in the commands that they submit to NICs 28.

Figure 3:
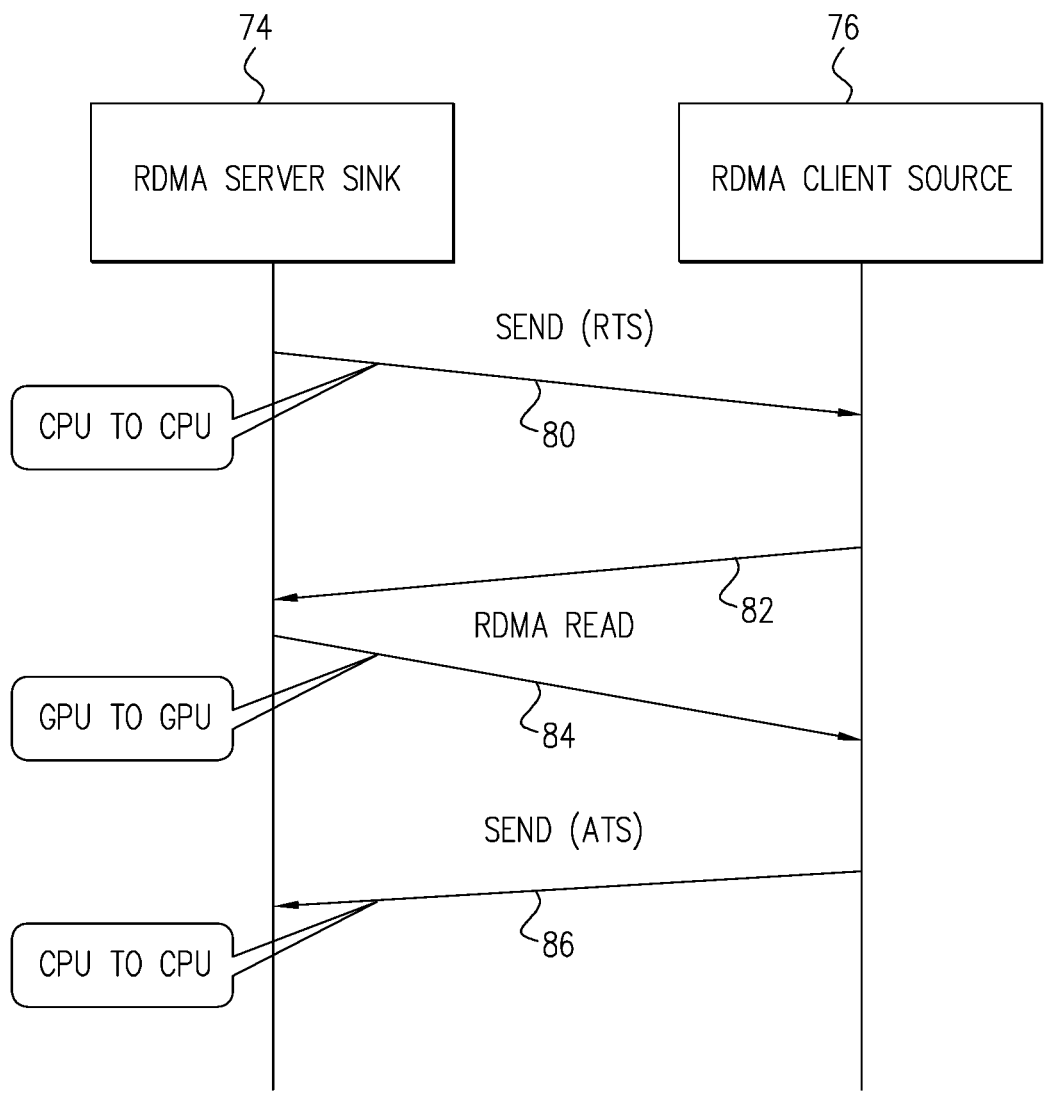
FIG. 3 is a ladder diagram, which schematically illustrates a method for copying data and metadata between partitions of a processing pipeline, in accordance with an embodiment of the invention.

FIG. 3 is a ladder diagram, which schematically illustrates a method for copying data and metadata between partitions of a processing pipeline, for example partitions 70 and 72 (FIG. 2), in accordance with an embodiment of the invention.

When a frame of processed data is received in the output buffer in the last stage of partition 70 (for example, stage c or stage s), RDMA server module 74 notifies CPU 30 of host computer 22, which then conveys a request to send (RTS) message 80 to RDMA client module 76 on host computer 24. Specifically, CPU 30 of host computer 22 submits a SEND WQE to NIC 28, instructing the NIC to convey RTS message 80 over network 26 in a SEND packet to NIC 28 of host computer 24. This packet contains metadata indicating, for example, the address of the buffer 42 (FIG. 1) that contains the output data to be transferred, as well as other state parameters to be used by RDMA client module 76 in retrieving and serving the data to the next processing stage in partition 72.

Upon receiving RTS message 80 in RDMA client module 76, CPU 30 of host computer 24 submits a WQE instructing NIC 28 to send an RDMA read request packet 82 to host computer 22. Based on the metadata provided in RTS message 80, RDMA read request packet 82 specifies the address and size of buffer 42 from which NIC 28 of host computer 22 is to read the data for transfer to host computer 24. NIC 28 is able to access buffer 42 in memory 40 of GPU 34 directly, for example using the GPUDirect RDMA capabilities of advanced Nvidia GPUs and NICs, without involving CPU 30 in the data access operations. NIC 28 of host computer 22 retrieves the data from buffer 42 and inserts the data in the payloads of one or more RDMA read response packets 84, which it transmits over network 26 to host computer 24. Upon receiving packets 84, NIC 28 writes the data to the buffer 44 indicated by the RDMA read request WQE. After writing the data to buffer 44, NIC 28 notifies GPU 34 of host computer 24 that the RDMA read operation has been completed, thus enabling the first processing stage in partition 72 to read and process the data.

Once the data transfer to buffer 44 has been successfully completed, NIC 28 of host computer 24 sends an acknowledgment packet 86, in response to the original RTS message 80. NIC 28 of host computer 22 conveys this message to CPU 30, which then releases the buffer 42 that held the output data, so that this buffer can be reused to receive the next frame of output data.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing, comprising:
receiving a definition of a video processing pipeline comprising multiple sequential processing stages for processing an input video stream having a predefined video frame rate;
partitioning the video processing pipeline into a plurality of partitions to enable completion of all processing stages within a video frame duration that is determined by the predefined video frame rate, each partition comprising one or more successive stages of the video processing pipeline, including at least a first partition and a second partition following the first partition in the video processing pipeline;
executing the first partition of the video processing pipeline on a first computational accelerator, whereby the first computational accelerator writes output data from a final stage of the first partition for a first video frame to an output buffer in a first memory;
copying the output data over a packet communication network to an input buffer in a second memory;
executing the second partition of the video processing pipeline on a second computational accelerator using the copied output data in the second memory as input data to a first stage of the second partition; and
while the second computational accelerator processes the copied output data from the first video frame, executing the first partition of the video processing pipeline for a next video frame on the first computational accelerator, thereby enabling real-time processing of consecutive video frames at the predefined video frame rate.

2. The method according to claim 1, wherein the first and second computational accelerators comprise graphics processing units (GPUs).

3. The method according to claim 1, wherein the stages of the processing pipeline comprise computational modules selected from a software library for implementation on the computational accelerators.

4. The method according to claim 1, wherein the plurality of partitions includes a third partition following the second partition in the processing pipeline, and wherein the method comprises copying further output data written to the second memory by the final stage of the second partition over the packet communication network to a third memory for input to execution of the third partition on a third computational accelerator.

5. The method according to claim 1, wherein the first and second computational accelerators are connected to the packet communication network by respective first and second network interface controllers (NICs), and wherein copying the output data comprises executing a remote direct memory access (RDMA) transaction between the first and second NICs.

6. The method according to claim 5, wherein executing the RDMA transaction comprises transmitting an RDMA read request packet from the second NIC to the first NIC, and transmitting one or more RDMA read response packets containing the output data from the final stage of the first partition from the first NIC to the second NIC.

7. The method according to claim 6, and comprising transmitting a send packet from the first NIC to the second NIC containing metadata with respect to the output data to be copied, wherein the second NIC transmits the RDMA read request in response to receiving the metadata.

8. A processing system, comprising:
a network interface controller (NIC), for connection to a packet communication network;
a first computational accelerator;
a first memory; and
a central processing unit (CPU), which is to receive a definition of a video processing pipeline comprising multiple sequential processing stages for processing an input video stream having a predefined video frame rate, to partition the video processing pipeline into a plurality of partitions to enable completion of all processing stages within a video frame duration that is determined by the predefined video frame rate, each partition comprising one or more successive stages of the video processing pipeline, including at least a first partition and a second partition following the first partition in the video processing pipeline, to instruct the first computational accelerator to execute the first partition of the video processing pipeline, whereby the first computational accelerator writes output data from a final stage of the first partition for a first video frame to an output buffer in the first memory, to instruct the NIC to copy the output data over the packet communication network to an input buffer in a second memory for execution of the second partition of the video processing pipeline on a second computational accelerator using the copied output data in the second memory as input data to a first stage of the second partition, and to cause the first computational accelerator to process the first partition of the video processing pipeline for a next video frame while the second computational accelerator processes the copied output data from the first video frame, thereby enabling real-time processing of consecutive video frames at the predefined video frame rate.

9. The system according to claim 8, wherein the first and second computational accelerators comprise graphics processing units (GPUs).

10. The system according to claim 8, wherein the stages of the processing pipeline comprise computational modules selected from a software library for implementation on the computational accelerators.

11. The system according to claim 8, wherein the plurality of partitions includes a third partition following the second partition in the processing pipeline, and wherein further output data written to the second memory by the final stage of the second partition is to be copied over the packet communication network to a third memory for input to execution of the third partition on a third computational accelerator.

12. The system according to claim 8, wherein the NIC is to copy the output data by executing a remote direct memory access (RDMA) transaction over the packet communication network.

13. The system according to claim 12, wherein executing the RDMA transaction comprises receiving an RDMA read request packet from a further NIC associated with the second memory, and transmitting one or more RDMA read response packets containing the output data from the final stage of the first partition to the further NIC.

14. The system according to claim 13, wherein the NIC is to transmit a send packet to the further NIC containing metadata with respect to the output data to be copied, wherein the further NIC transmits the RDMA read request in response to receiving the metadata.

15. A computer program product, comprising a tangible, non-transitory computer-readable medium in which program instructions are stored, which instructions, when read by a computer, cause the computer to receive a definition of a video processing pipeline comprising multiple sequential processing stages for processing an input video stream having a predefined video frame rate, to partition the video processing pipeline into a plurality of partitions to enable completion of all processing stages within a video frame duration that is determined by the predefined video frame rate, each partition comprising one or more successive stages of the video processing pipeline, including at least a first partition and a second partition following the first partition in the video processing pipeline, to instruct a first computational accelerator to execute the first partition of the video processing pipeline, whereby the first computational accelerator writes output data from a final stage of the first partition for a first video frame to an output buffer in a first memory, to instruct a NIC to copy the output data over a packet communication network to an input buffer in a second memory for execution of the second partition of the video processing pipeline on a second computational accelerator using the copied output data in the second memory as input data to a first stage of the second partition, and to cause the first computational accelerator to process the first partition of the video processing pipeline for a next video frame while the second computational accelerator processes the copied output data from the first video frame, thereby enabling real-time processing of consecutive video frames at the predefined video frame rate.

16. The product according to claim 15, wherein the first and second computational accelerators comprise graphics processing units (GPUs).

17. The product according to claim 15, wherein the stages of the processing pipeline comprise computational modules selected from a software library for implementation on the computational accelerators.

18. The product according to claim 15, wherein the plurality of partitions includes a third partition following the second partition in the processing pipeline, and wherein the instructions cause the computer to instruct a further NIC to copy further output data written to the second memory by the final stage of the second partition over the packet communication network to a third memory for input to execution of the third partition on a third computational accelerator.

19. The product according to claim 15, wherein the instructions cause the NIC to copy the output data by executing a remote direct memory access (RDMA) transaction over the packet communication network.

20. The product according to claim 19, wherein executing the RDMA transaction comprises receiving an RDMA read request packet from a further NIC associated with the second memory, and transmitting one or more RDMA read response packets containing the output data from the final stage of the first partition to the further NIC.

21. The product according to claim 20, wherein the instructions cause the NIC to transmit a send packet to the further NIC containing metadata with respect to the output data to be copied, wherein the further NIC transmits the RDMA read request in response to receiving the metadata.

* * * * *